United States Patent
Van Der Kuijl et al.

(10) Patent No.: US 9,571,778 B2
(45) Date of Patent: Feb. 14, 2017

(54) CRADLE SYSTEM FOR AUDIOVISUAL EQUIPMENT

(71) Applicant: GVBB HOLDINGS S.A.R.L., Luxembourg (LU)

(72) Inventors: Evert Marinus Van Der Kuijl, Wouw (NL); Paulus Wilhelmus Marinus Gijsbertus De Bresser, Best (NL); Petrus Cornelis Adrianus Maria Vissers, Prinsenbeek (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 520 days.

(21) Appl. No.: 14/019,497

(22) Filed: Sep. 5, 2013

(65) Prior Publication Data

US 2014/0063346 A1    Mar. 6, 2014

Related U.S. Application Data

(60) Provisional application No. 61/697,181, filed on Sep. 5, 2012.

(51) Int. Cl.
*G06F 13/42* (2006.01)
*H04N 5/44* (2011.01)
*H04N 5/222* (2006.01)

(52) U.S. Cl.
CPC ............... *H04N 5/44* (2013.01); *H04N 5/222* (2013.01)

(58) Field of Classification Search
None
See application file for complete search history.

(56) References Cited

U.S. PATENT DOCUMENTS

| | | | | |
|---|---|---|---|---|
| 5,666,428 | A * | 9/1997 | Farinelli | H04M 1/723 379/102.02 |
| 2006/0062538 | A1* | 3/2006 | Araki | G02B 6/4452 385/135 |
| 2011/0043333 | A1* | 2/2011 | German | H04Q 1/136 340/10.1 |
| 2013/0050581 | A1* | 2/2013 | Deshpande | H04N 5/247 348/705 |

* cited by examiner

*Primary Examiner* — Ojiako Nwugo
(74) *Attorney, Agent, or Firm* — Arent Fox LLP

(57) ABSTRACT

Methods and apparatuses for building and reconfiguring audiovisual equipment in a video production system. A wiring cradle may be installed in the video production system and one or more electrical or optical connections may be established between the wiring cradle and another element of the video production system. Electrical connections may be established through the wiring cradle between a video processing component mounted in the wiring cradle and at least one other component of the video production system according to an interconnection configuration for the video production system. The wiring cradle physically secures the wiring cradle to a rack or enclosure. Electrical connection may be established by automatically connecting inputs or outputs based on an interconnection configuration maintained in non-volatile storage provided in the wiring cradle.

25 Claims, 6 Drawing Sheets

CRADLE SYSTEM FOR AUDIOVISUAL EQUIPMENT

CROSS-REFERENCE TO RELATED APPLICATION

This application claims priority to U.S. Provisional Patent Application No. 61/697,181, filed on Sep. 5, 2012.

BACKGROUND

Field

The present disclosure relates generally to video production systems and, more particularly, to systems and methods for managing broadcast content.

Background

Video production systems used in, for example, television studios, or deployed at sporting events typically receive video and audio feeds from multiple cameras though various control, processing, routing and communications devices. Various elements of the equipment may be used is different environments and configurations, including in studio and outside broadcast operations. Much of the equipment is networked and can communicate for control, monitoring and configuration purposes. Some or all of the equipment may be provisioned and configured to meet a variety of video formats and to provide changing levels of functionality. Configuration changes may be expensive, time consuming and require upgrades or replacement of certain components.

SUMMARY

In an aspect of the disclosure, a method of configuring audiovisual equipment includes using a wiring cradle and may further include installing a wiring cradle in a video production system, establishing one or more electrical or optical connections between the wiring cradle and an element of the video production system, mounting a video processing component in the wiring cradle, and establishing an electrical connection through the wiring cradle between the video processing component and at least one other component of the video production system according to an interconnection configuration for the video production system. In some embodiments, installing the wiring cradle may include physically securing the wiring cradle to a rack or enclosure.

In an aspect of the disclosure, at least a portion of the interconnection configuration is maintained in non-volatile storage of the wiring cradle. Establishing the electrical connection may include automatically connecting inputs or outputs of the video processing component to corresponding inputs or outputs of the at least one other component of the video production system.

In an aspect of the disclosure, the method may include configuring a plurality of wiring cradles. Each wiring cradle may mechanically secure a video processing component to the video production system. Each of the plurality of wiring cradles may include a storage device that maintains interconnection configuration information. The interconnection configuration information maintained by the plurality of wiring cradles may be provided by a configuration entity that defines functionality of the video production system. The interconnection configuration information maintained by the plurality of wiring cradles may be provided by a configuration entity that controls an operational aspect of the video production system.

In an aspect of the disclosure, the method may include selecting a wiring configuration from information maintained in the non-volatile storage based on an identification of a type of the video processing component. A processor may be provided in the wiring cradle and the processor may identify the type of the video processing component by interrogating the video processing component. The interconnection configuration for the video production system may define a physical location for each video processing component. The video processing component may be interchangeably used in a plurality of different video production systems. At least one of the different video production systems may be deployed in an outside broadcast vehicle. At least one of the different video production systems may be deployed in a studio.

In an aspect of the disclosure, the electrical connection between the video processing component and the at least one other component one of video production system may support a data rate of at least 12.5 gigabits per second. The wiring cradle may configure an operational aspect of the video processing component based on the interconnection scheme. The video processing component may include one or more of a recording device, a communications gateway, a base station that controls operation of a camera, a video mixer, a special effects processor, and a video encoder. The interconnection configuration for the video production system may be provided by one or more of a communications gateway, a base station that controls operation of a camera, a video mixer, a special effects processor, and a video encoder.

In an aspect of the disclosure, a wiring cradle for video production equipment my include a frame configured to be physically and electrically attached to a rack in a video production system, one or more fasteners configured to securely mount a video processing device within the rack, an interconnect having one or more connectors that electrically connect with the video device, and programmable non-volatile storage that maintains an interconnect configuration. Connections between the one or more connectors and wiring of the rack may be established according to the interconnect configuration.

In an aspect of the disclosure, the wiring cradle may include a processor that establishes the connections between the one or more connectors and the wiring of the rack based on the interconnect configuration maintained by the programmable storage. The interconnect configuration may correspond to a studio or outside broadcast setup of the video production system. The interconnect configuration may be provided by a configuration entity that defines functionality of the video production system. The interconnect configuration may define a physical location for each of a plurality of video processing components.

In an aspect of the disclosure, the processor is configured to identify the video processing device, and establish the connections between the one or more connectors and the wiring of the rack when the video processing device is physically located in accordance with the interconnect configuration.

In an aspect of the disclosure, the processor is configured to identify a type of the video processing device and to select the interconnect configuration corresponding to the type of the video processing device from a plurality of interconnect configurations maintained by the programmable non-volatile storage. The video processing device may include one or more of a recording device, a communications gateway, a base station that controls operation of a camera, a video mixer, a special effects processor,

DETAILED DESCRIPTION

Figure 1:
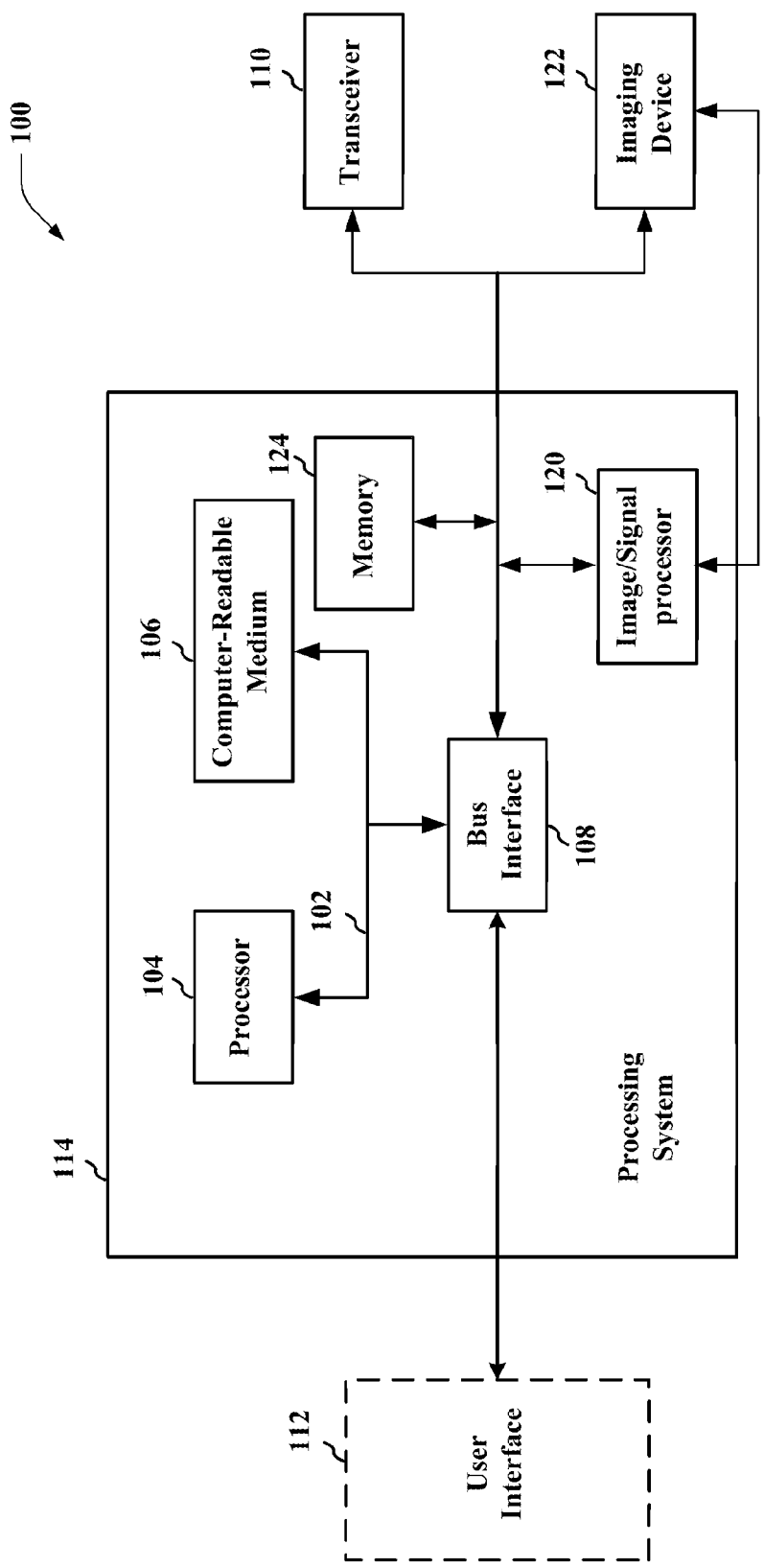
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, image processors, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium.

A computer-readable medium may include, by way of example, non-transitory storage such as a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, as well as a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104 and image/signal processor 120, non-transitory computer-readable media, represented generally by the computer-readable medium 106, and memory, represented generally by the memory 124. The bus 102 may also link various other circuits such as timing sources, peripherals, voltage regulators, and power management circuits, which are well known in the art, and therefore, will not be described any further.

In some embodiments, a bus interface 108 provides an interface between the bus 102 and a transceiver 110. The transceiver 110 provides a means for communicating with various other apparatus over a transmission medium. In some embodiments, bus interface 108 may provide an interface between the bus 102 and an imaging device 122. The imaging device 122 may capture a sequence of images of a scene or event to enable the processing system 114 to produce a video feed. Image/signal processor 120 may be configured to operate on pixels in the sequence of images to produce a signal representative of one or more images captured by the imaging device 122.

In one example, the processing system 114 may be incorporated in a camera, such that the imaging device 122 may include a charge-coupled device (CCD) array or another device suitable for capturing images that provides a 'raw' image signal directly to the image/signal processor 120, which may process pixel information in a sequence of images to produce a standardized video output. In another example, the imaging device 122 may include a camera in which image/signal processor 120 may be employed to extract information from a signal transmitted by the imaging device 122. The extracted information may include a compressed video stream and metadata including background information, foreground objects, motion vectors, virtual lines, object counting, object tracking and other metadata. Depending upon the nature of the apparatus, a user interface 112 (e.g., keypad, display, speaker, microphone, and/or joystick) may also be provided.

The processor 104 may be responsible for managing the bus 102 and general processing, including the execution of software stored on the computer-readable medium 106. The software, when executed by the processor 104, may cause the processing system 114 to perform the various functions described infra for any particular apparatus. The non-transitory computer-readable medium 106 may also be used for storing data that is manipulated by the processor 104 when executing software.

By way of example and without limitation, the aspects of the present disclosure illustrated in FIG. 1 are presented with reference to systems and methods used to configure components of a video production system that may be used for production of television programming or at sports events. The processing system 114 may be at least partially embodied in one or more semiconductor integrated circuits provided on a wiring cradle and/or chassis used to mount audiovisual equipment in video production system. The various concepts presented throughout this disclosure may be implemented across a broad variety of imaging applications, including systems that capture and process video and/or still images, video conferencing systems and so on. The various concepts presented throughout this disclosure may be applied to other equipment that may be communicatively coupled to components of a video production system, including, for example, smart phones and tablet computers, as well as other computing platforms.

As described herein, a video production system may include a variety of components, which may have multiple features and perform a variety of functions. Components of the video production system may be deployed at different times in different systems and/or shared between different systems. Certain aspects of this disclosure relate to a configurable wiring cradle that provides a pre-wired connection for broadcast video equipment used in a video production system.

Figure 2:
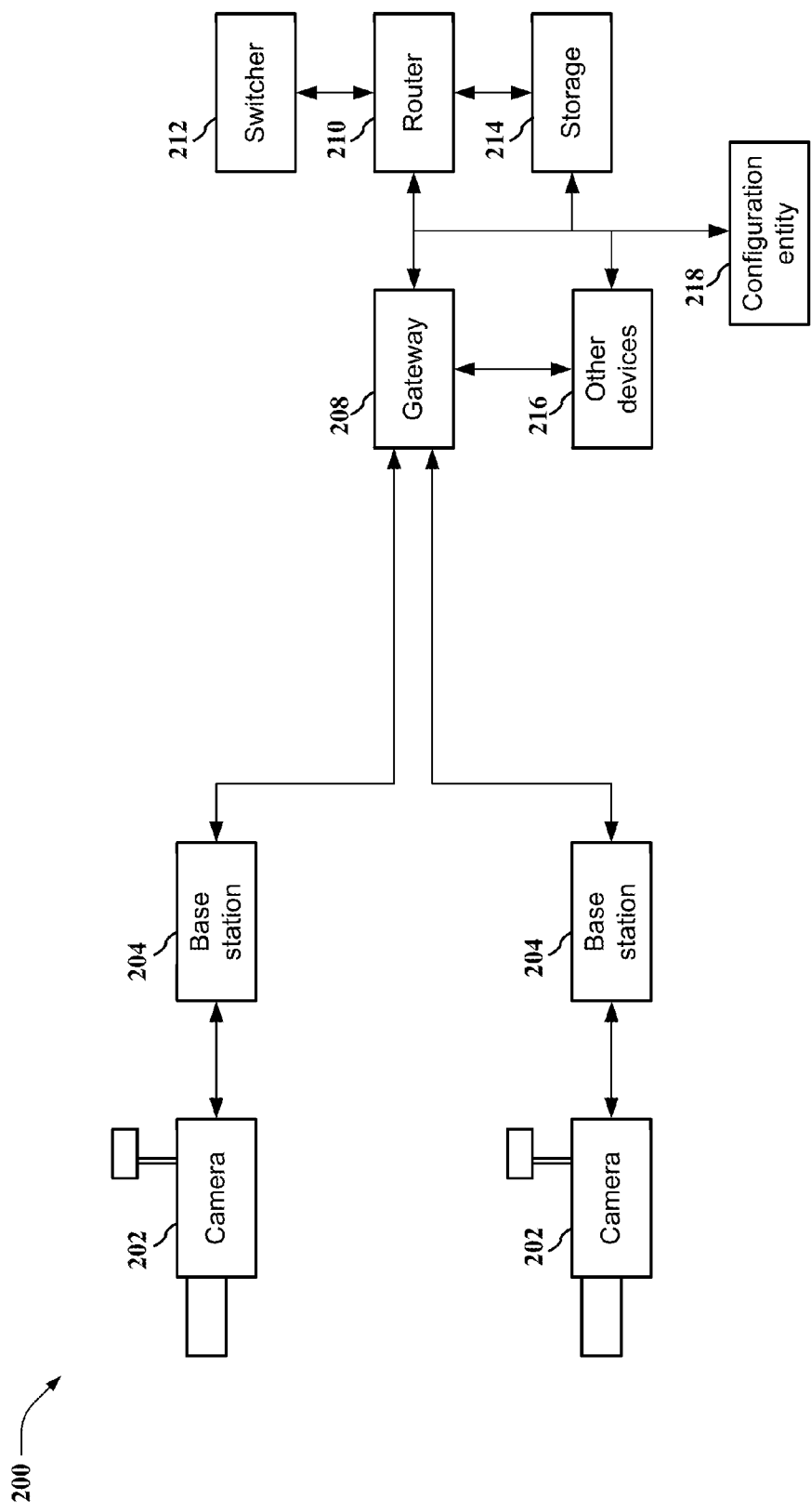
FIG. 2 is a block diagram illustrating an example of a video production system.

FIG. 2 is a block diagram 200 illustrating a video production system. One or more of the cameras 202 may be deployed to capture video images of a scene or event. Camera 202 typically includes a processing system that produces an encoded video output representative of a sequence of images captured by the imaging device 122 (see FIG. 1). For the purposes of this description, video feeds and other signals are transmitted to downstream devices by the camera 202, or a component of the camera 202. A downstream signal may also include a signal transmitted from a downstream device to another device that is further downstream relative of the camera 202. Control, command, and other signals received by the camera 202, including audio signals directed to an operator, may be referred to as upstream signals, as are any other signals transmitted in the general direction of the camera 202.

In some embodiments, the camera 202 may be connected to a base station 204. The base station 204 may provide power and communications services for the camera 202 and may enable, for example, transmission of the camera output over long distances. The base station 204 may support other functions including, for example, configuration, intercom, a variety of audio and other communications systems, and teleprompter systems, as well as video processing on behalf of the camera 202.

The base station 204 may control and monitor the operation of one or more of the cameras 202. The base station 204 may support standard or proprietary control interface protocols and support various different camera types through a single command interface. The base station 204 may be used to configure and coordinate sets of the cameras 202 and may provide a communications channel for transferring operational parameters between the cameras 202. The base station 204 may capture a configuration for one or more of the cameras 202 as a scene configuration. The base station 204 may store the scene configuration and/or share the scene configuration with other system components. The scene configuration may be used at a later time to restore settings of the camera 202 and/or restore other controllable features of the system. The base station 204 may cause the cameras 202 to perform diagnostics and may provide status information of the cameras 202 to one or more downstream devices.

One or more communications devices may be deployed to serve as a communication gateway(s) 208 and/or router(s) 210. The communication gateway 208 may be used to provide connections between base stations 204 and other system components using any suitable data communications standards, including, for example, Ethernet, WiFi, cellular wireless network, etc. In some embodiments, the cameras 202, the base stations 204, and other system components may communicate control and audio/visual signals using a local or wide area network. The communication gateway 208 may provide network configuration and management services that enable other system devices 216 to communicate with other networked components and components that are not networked. Other network devices may include different types of base stations 204 and cameras 202.

The router 210 may be used to support the transmission of video feeds within the system. The router 210 may be configured to receive video feeds from one or more of the cameras 202 and/or the storages 214 and to provide some combination of those feeds to downstream components through a switcher 212. The storage 214 may include any audio/video recording device suitable for capturing, storing, replaying and/or forwarding video and audio feeds produced or used by a video production system. The switcher 212 may provide video and audio feeds to one or more of a production systems and/or a transmission system, such as a microwave transmission system. The router 210 may receive video for broadcast and may provide broadcast feeds to broadcast networks, the video storage systems 214 and/or other devices 216, such as network streaming servers.

Broadcast equipment is frequently transported from venue to venue and certain aspects the generalized configuration depicted in FIG. 2 may change between venues and between projects within the same venue. Accordingly, certain equipment may frequently be transferred between different production systems. For example, certain equipment commonly used in a production studio may be deployed occasionally in an outside broadcast vehicle, and such equipment may be interchangeably moved between the vehicle and studio as needed. Broadcast equipment may be shared and/or used by different entities, including different broadcasters, system houses and rental companies. Accordingly, each of the entities may deploy the broadcast equipment in different configurations and equipment may have different physical connections in different deployments. Conventionally, redeployment of audiovisual equipment typically entails significant reconnection and relocation of equipment within the video production system.

Embodiments of the present disclosure permit quick exchange, set-up, and configuration of equipment to minimize down-time of a broadcast system during setup, reconfiguration and after replacement of failed or faulty components. Initial build and configuration of in-studio systems and/or OBVs may conventionally require availability of all equipment during build-up and configuration. The amount of time elapsed can range between several months to several years to mount and test the wiring, with a consequent requirement for large capital investments during non-revenue generating activities.

Typically broadcast equipment has a large amount of physical input/output (I/O) connections. Wiring of broadcast equipment in a studio or OBV can be complex and building and testing may be time-consuming. Reconfiguration following physical mounting and dismounting of individual components of video production systems and other audiovisual equipment is also time-consuming because of the complexity of the equipment and cost of reconfiguration.

Figure 3:
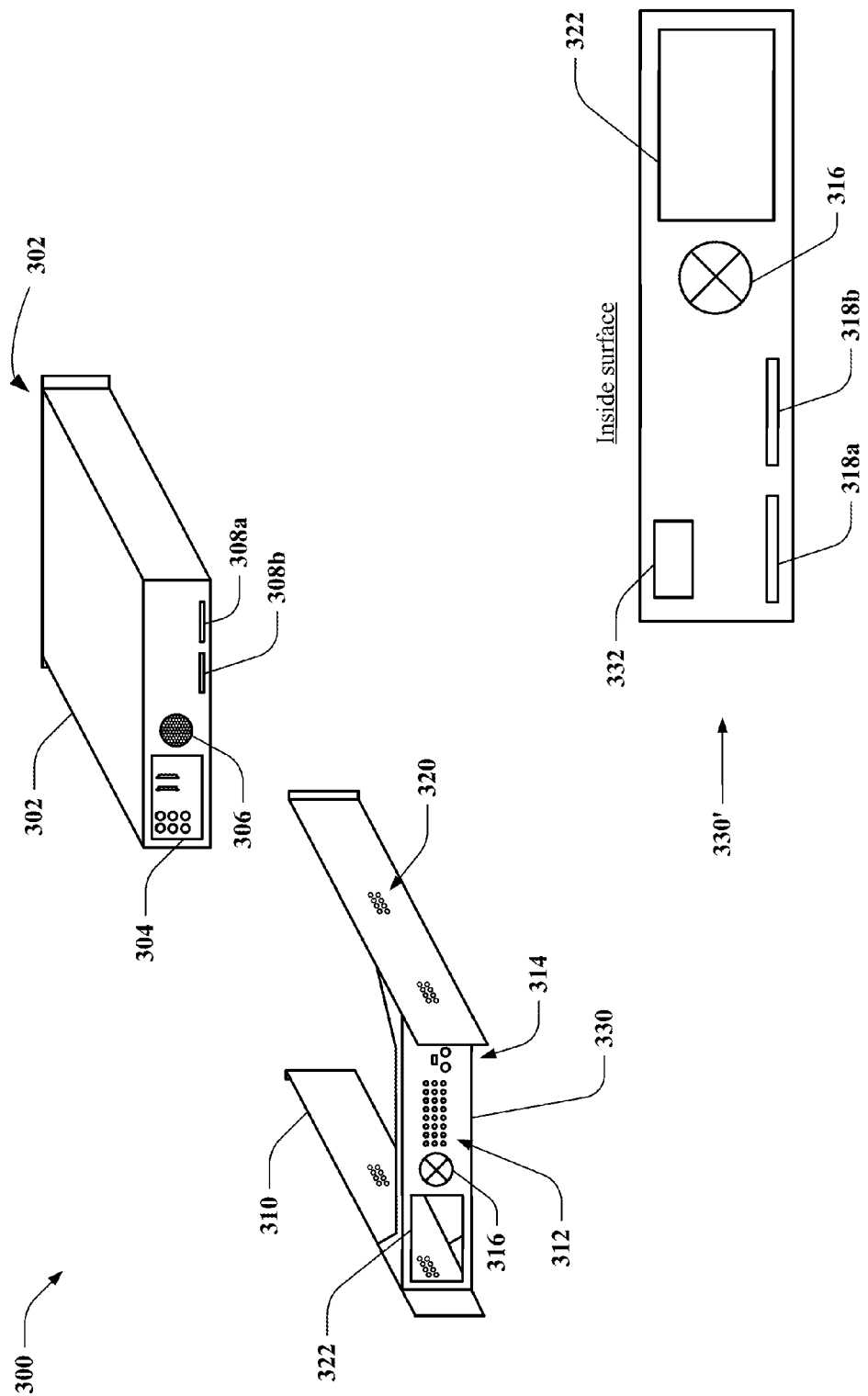
FIG. 3 is diagram illustrating certain aspects of a wiring cradle.
Figure 4:
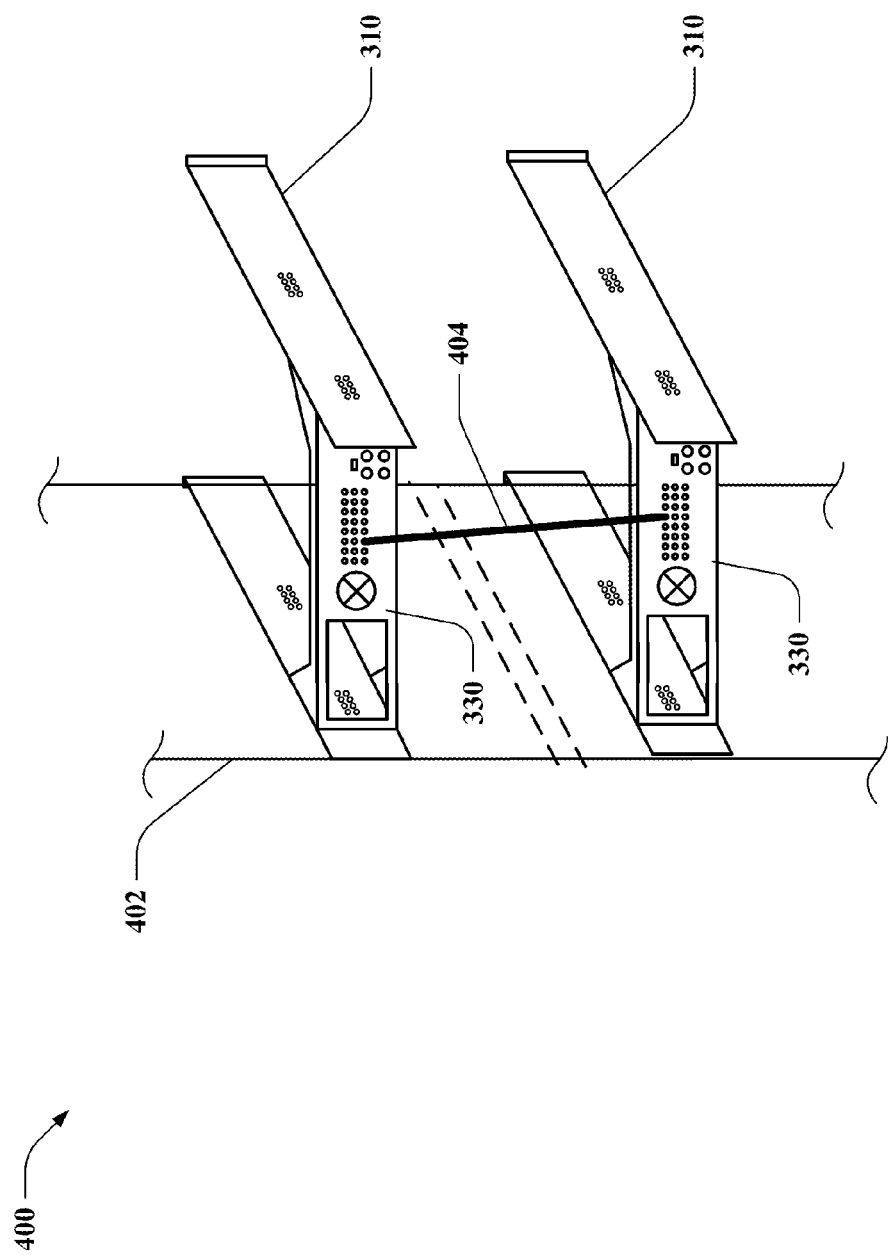
FIG. 4 is diagram illustrating certain aspects of a wiring cradle deployed in a video production system.

In certain embodiments of the present disclosure, video equipment may be constructed such that physical I/O components can be separated from functional components. FIGS. 3 and 4 depict a simplified example in which physical I/O components may be embodied in a wiring cradle 310 that may be pre-wired and tested without the presence of a device 302. One or more of the wiring cradles 310 may be incorporated in a rack or other enclosure 402 of a video production system located in a studio, a remote set, or in an OBV. The wiring cradle 310 may be interconnected with a wiring system such that the connections 404 between two or more of the wiring cradles 310 may be established and tested during system build or reconfiguration procedures.

The wiring cradle 310 may include an interconnect panel 330 that conducts a combination of electrical and/or optical signals between the device 302 and the connectors 312, 314. In one example, the connectors 312, 314 may be provided on a rear surface of the interconnect 330 of the wiring cradle 310 to permit patching and other forms of connection between the wring cradles 310 and/or other systems and components. The device 302 may provide one or more of the connectors 308a and/or 308b that combine a plurality of signals received or transmitted by the wiring cradle 310. The connectors 308a and/or 308b may be configured to mate or otherwise connect with the cradle connectors 318a and/or 318b, such as, for example, on the reverse side of the interconnect 330'. The connectors 308a and/or 308b may carry optical and/or electrical signals and may support a combination of digital and analog signaling.

In certain embodiments, routing of signals received through the connectors 308a, 318a and/or 308b, 318b may be programmatically reconfigured, although one or more connections may be hardwired through the interconnect 330 on the device 302. In some embodiments, the device 302 may receive inputs and/or provide outputs through discrete connectors 304, which may be exposed by the hole 322 in the device 302. The discrete connectors 304 may be manually connected to other devices or other systems. Certain signals may be repeated between the discrete connectors 304 and one or more of the connectors 308a, 308b.

In some embodiments, the interconnect 330 includes an active backplane or circuit board that may include electronic and/or optical switching circuitry 332. The circuitry 332 may include one or more semiconductor devices and may include drivers, repeaters, conversion devices, translation devices and/or switching devices that can be programmed to provide configurable connections between the video processing device 302 and other components and/or devices in a video production system. Thus, for example, a video recorder may be connected to a mixing component by programming an interconnect path between the video recorder and the mixing component.

The circuitry 332 may be programmed to configure routing and other characteristics of a connection, including bandwidth, impedance, routing, etc. The circuitry 332 may be deployed in one or more locations on a backplane or circuit board, and may include one or more semiconductor integrated circuit devices. It will be appreciated that at least some interconnections may be provided through dedicated cabling or connectors, typically connected to the device 302 through a hole 322. For example, the dedicated cabling may include a digital fiber optic cable.

The circuitry 332 may include non-volatile storage that maintains configuration information defining interconnect structure, characteristics and paths within the wiring cradle 310. The configuration information may be provided as a portion of a system configuration that defines various interconnect configurations for a plurality of the wiring cradles 310. In some embodiments, the circuitry 332 may include a processor that controls and/or modifies a connection scheme implemented on the interconnect 330. The switching components of the circuitry 332 may be constructed such that connections are maintained during and after power loss.

In some embodiments, a device 302 mounted in the wiring cradle 310 may communicate with storage media of the wiring cradle 310 in order to obtain interconnection configurations and other information related to system configuration. Accordingly, the device 302 may be configured to control the circuitry 332 and to establish an interconnection scheme on the interconnect 330. In such embodiments, a processor may not be deployed on the interconnect 330 and the circuitry 332 may include a memory accessible by a configuration entity 218 (see FIG. 2) and the device 302 mounted by the wiring cradle 310. The configuration entity 218 may provide configuration information maintained by the wiring cradle 310 and implemented by the device 302 and/or by a processor provided on the interconnect 330.

In some embodiments, the configuration entity 218 (see FIG. 2) may directly write the configuration information to the storage of the wiring cradle 310. A component of the video production system 200 may be adapted to serve as the configuration entity 218. The component may be adapted through programming and/or by modification. In some embodiments, the configuration entity 218 may be a computing device, smart phone or other device that delivers the configuration through a wired or wireless connection between the wiring cradle and computing device.

In some embodiments, a configuration stored on the non-volatile memory can be used to reconfigure the wiring cradle 310 during a system build. The stored configuration may be provided in the physical I/O component permits a pre-wired set-up and configuration to be performed in a studio or outside broadcast system in advance of equipment installation and use. The stored configuration may be maintained, copied, and restored under the control of the configuration entity 218 (see FIG. 2). Configuration information may be stored locally in a computing device, in one or more I/O component and/or on a networked server. The racks 400 can be configured by restoring a previously used wiring configuration for a system configuration to be built or implemented. In some embodiments, the wiring cradle 310 may recognize a type of the device 302 installed in the wiring cradle 310 and can automatically select a standard wiring configuration for the type of device and/or for a preconfigured wiring configuration maintained by non-volatile storage.

In some embodiments, the wiring cradle 310 may be 'manually wired' into a video production system. For example, the wiring cradle 310 may provide interconnections between components of one or more video production systems using a wiring harness in a frame or the rack 400. The device(s) 302 may include one or more of the video recorder 214, the mixer 216, the router 210, the switcher 212, the gateway 208, and/or the base station/controller 204 (see FIG. 2). The wiring cradle 310 may be connected to other components using patch cables and other connectors that are directly connected between the wiring cradle 310 and other components.

In certain embodiments, the wiring cradle 310 may be constructed for use in standards-defined racks 400, shelves or other enclosures used for broadcast video production systems. For example, the wiring cradle 310 may be configured to replace rack mounting rails used for mounting broadcast standard devices 302 within a twenty-two inch width rack. The wiring cradle 310 may provide mechanical strengthening, programmable interconnection and grounding and bonding stud for the device 302. The device 302 may be fastened to the wiring cradle 310 and the wiring cradle 310 may fastened within the rack 400, shelf or another enclosure type using screws, latches, brackets, friction locks, or any suitable mechanism known in the field.

In some embodiments, hot-swap and rapid cold-swap of equipment is facilitated by preconfigured I/O wiring. A failed functional component may be replaced without physical rewiring. In some embodiments, a failed wiring cradle may be replaced and reconfigured by updating the non-volatile memory in the new wiring cradle and/or reconnecting patch cables and other connectors. In some embodiments, relocation of equipment may be accelerated because wiring structures can be more easily reconstructed and may be more easily disassembled and reassembled.

Figure 5:
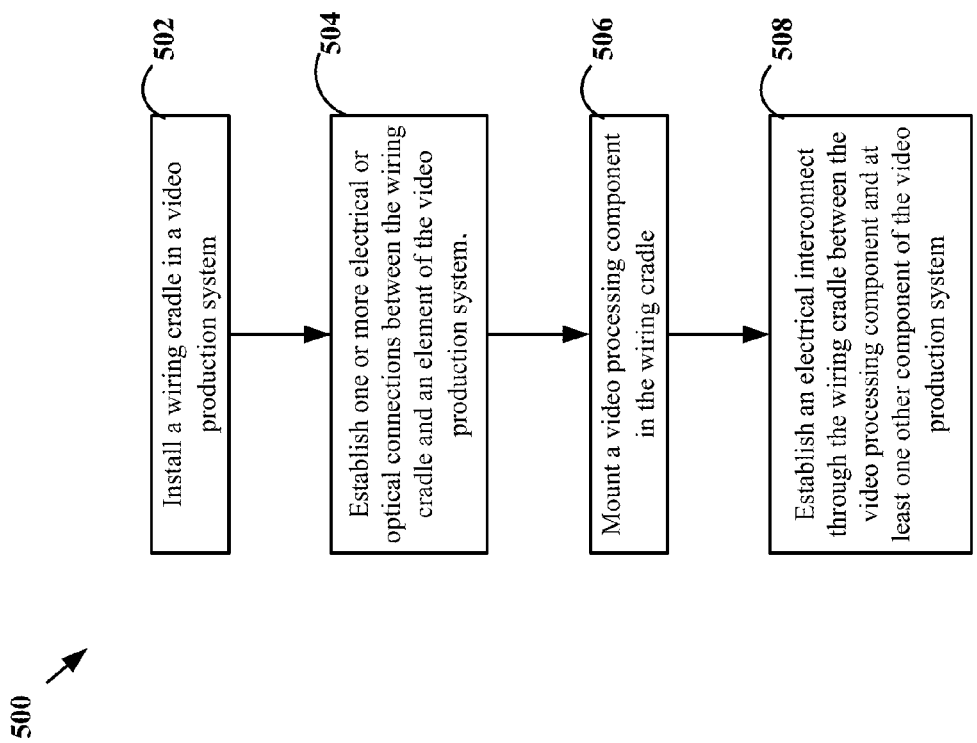
FIG. 5 is a flowchart illustrating a method for constructing a video production system.

FIG. 5 is a flow chart 500 describing a method for interconnecting broadcast video equipment. At step 502, a wiring cradle is installed in a video production system. The wiring cradle may be installed by physically securing the wiring cradle to a rack, shelf or enclosure of the video production system.

At step 504, one or more electrical or optical connections are established between the wiring cradle and an element of the video production system.

At step 506, a video processing component is mounted in the wiring cradle.

At step 508, an electrical connection is established through the wiring cradle between the video processing component and at least one other component of the video production system according to an interconnection configuration for the video production system. At least a portion of the interconnection configuration may be maintained in non-volatile storage deployed on a surface of the wiring cradle. The electrical interconnect may be established by automatically connecting inputs or outputs of the video processing component to corresponding inputs or outputs of the at least one other component of the video production system.

In some embodiments, the method may include configuring a plurality of wiring cradles, whereby each wiring cradle mechanically secures a video processing component to the video production system. Each of the plurality of wiring cradles may include a storage device that maintains interconnection configuration information. The interconnection configuration information maintained by the plurality of wiring cradles may be provided by a configuration entity that defines functionality of the video production system. The interconnection configuration information maintained by the plurality of wiring cradles may be provided by a configuration entity that controls an operational aspect of the video production system. The interconnection configuration maintained in the non-volatile storage may be used to select a wiring configuration for the video processing component responsive to identification of a type of the video processing component. A processor mounted on the wiring cradle may determine the type of the video processing component by interrogating the video processing component.

In some embodiments, the interconnection configuration for the video production system defines a physical location for each video processing component. In some embodiments, the video processing component is interchangeably used in a plurality of different video production systems. In some embodiments, at least one of the different video production systems is deployed in an outside broadcast vehicle. In some embodiments, at least one of the different video production systems is deployed in a studio.

In some embodiments, the wiring cradle configures an operational aspect of the video processing component based on the interconnection scheme. The video processing component may include one or more of a recording device, a communications gateway, a base station that controls operation of a camera, a video mixer, a special effects processor, and a video encoder. The interconnection configuration for the video production system may be provided by one or more of a communications gateway, a base station that controls operation of a camera, a video mixer, a special effects processor, and a video encoder.

Figure 6:
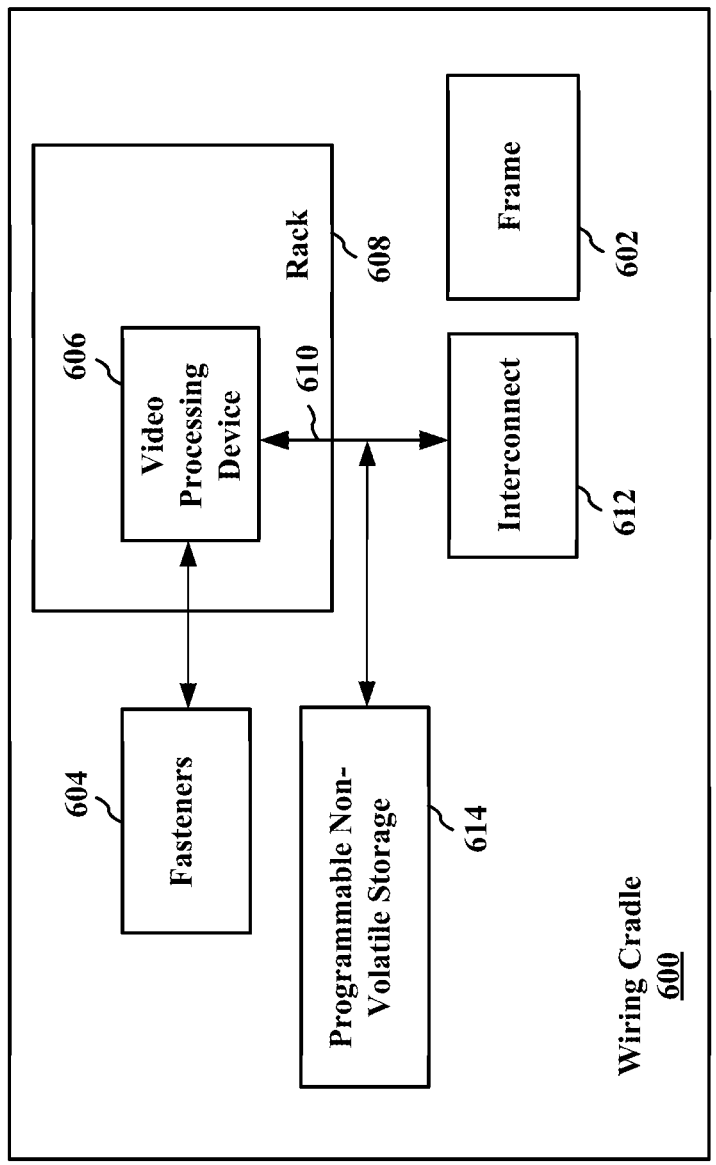
FIG. 6 is a block diagram of a wiring cradle for video production equipment.

FIG. 6 is a block diagram of a wiring cradle 600 for video production equipment. In the example illustrated in FIG. 6, the wiring cradle 600 for video production equipment includes a frame 602 is configured to be physically and electrically attached to a rack 608 in a video production system. The wiring cradle 600 also includes one or more fasteners 604 configured to securely mount a video processing device 606 within the rack 608. The wiring cradle 600 also includes an interconnect 612 having one or more connectors 610 that electrically connect with the video processing device. The wiring cradle 600 also includes a programmable non-volatile storage 614 that maintains an interconnect configuration such that connections between the one or more connectors 610 and the wiring of the rack 608 are established according to the interconnect configuration.

The aforementioned systems and methods may employ one or more of the processing system 114 configured to perform the functions recited by the aforementioned systems and methods. As described supra, the processing system 114 may include processor 104 and the image/signal processor 120. As such, in one configuration, the aforementioned systems and methods may be the processor 104 and the image/signal processor 120 configured to perform the functions recited by the aforementioned systems and methods.

Further, an apparatus may be a physical structure configured to perform various functions. The apparatus may be a machine or system. The apparatus may include a processing system. The processing system may include a processor connected to non-transitory computer-readable medium and configured to execute software stored on the non-transitory computer-readable medium. The non-transitory computer-readable medium may also be used for storing data that is manipulated by the processor when executing software. The apparatus may have various mechanical, hardware, and/or software modules that are specifically configured to perform the stated processes/algorithms described herein.

For example, the apparatus may provide a means for installing a wiring cradle in a video production system, wherein the installing the wiring cradle includes physically securing the wiring cradle to a rack or enclosure. The apparatus may also provide a means for establishing one or more electrical or optical connections between the wiring cradle and an element of the video production system. The apparatus may also provide a means for mounting a video processing component in the wiring cradle. The apparatus may also provide a means for establishing an electrical connection through the wiring cradle between the video processing component and at least one other component of the video production system according to an interconnection configuration for the video production system.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for interconnecting broadcast video equipment by installing a wiring cradle in a video production system and securing the wiring cradle to a rack or enclosure, comprising:
   installing the wiring cradle in the video production system, wherein installing the wiring cradle includes physically securing the wiring cradle to the rack or enclosure;
   establishing one or more electrical or optical connections between the wiring cradle and an element of the video production system;
   storing an interconnection configuration in a non-volatile storage, to programmatically route signals between a connection to a video production equipment and at least one other component of the video production system;
   receiving the video production equipment into the wiring cradle; and
   establishing an electrical connection through the wiring cradle between the video production equipment and the at least one other component of the video production system according to the stored interconnection configuration when the video production equipment is received into the wiring cradle,
   wherein the establishing of the electrical connection comprises programmatically routing signals received through one or more connectors.

2. The method of claim 1, wherein establishing the electrical connection includes automatically connecting inputs or outputs of the video production equipment to corresponding inputs or outputs of the at least one other component of the video production system.

3. The method of claim 1, further comprising configuring a plurality of wiring cradles, each wiring cradle mechanically securing a video production equipment to the video production system.

4. The method of claim 3, wherein each of the plurality of wiring cradles comprises a storage device that maintains interconnection configuration information.

5. The method of claim 4, wherein interconnection configuration information maintained by the plurality of wiring cradles is provided by a configuration entity that defines functionality of the video production system.

6. The method of claim 4, wherein interconnection configuration information maintained by the plurality of wiring cradles is provided by a configuration entity that controls an operational aspect of the video production system.

7. The method of claim 1, further comprising selecting a wiring configuration from the interconnection configuration maintained in the nonvolatile storage based on an identification of a type of the video production equipment.

8. The method of claim 7, wherein the wiring cradle comprises a processor configured to identify the type of the video production equipment by interrogating the video production equipment.

9. The method of claim 1, wherein the interconnection configuration for the video production system defines a physical location for each video production equipment.

10. The method of claim 1, wherein the video production equipment is interchangeably used in a plurality of different video production systems.

11. The method of claim 10, wherein at least one of the different video production systems is deployed in an outside broadcast vehicle.

12. The method of claim 10, wherein at least one of the different video production systems is deployed in a studio.

13. The method of claim 1, wherein the wiring cradle comprises a processor configured to configure an operational aspect of the video production equipment based on the interconnection configuration.

14. The method of claim 1, wherein the video production equipment comprises one or more of a recording device, a communications gateway, a base station that controls operation of a camera, a video mixer, a special effects processor, and a video encoder.

15. The method of claim 1, wherein the interconnection configuration for the video production system is provided by one or more of a communications gateway, a base station that controls operation of a camera, a video mixer, a special effects processor, and a video encoder.

16. A wiring cradle for video production equipment, comprising:
   a frame configured to be physically and electrically attached to a rack in a video production system, wherein the frame of the wiring cradle is configured to receive a video processing device in order to connect the video processing device to other components in the video production system;
   one or more fasteners configured to securely mount the video processing device within the rack;
   an interconnect having one or more connectors that electrically connect the video processing device to at least one component in the video production system; and
   a programmable non-volatile storage that stores an interconnect configuration configured to programmatically route signals between the one or more connectors connecting the video processing device to the at least one component in the video production system according to the stored interconnect configuration when the video processing device is received into the wiring cradle.

17. The wiring cradle of claim 16, further comprising a processor configured to:
   establish connections between the one or more connectors and the at least one component in the video production system based on the interconnect configuration maintained by the programmable storage.

18. The wiring cradle of claim 17, wherein the interconnect configuration corresponds to a studio or outside broadcast setup of the video production system.

19. The wiring cradle of claim 18, wherein the interconnect configuration is provided by a configuration entity that defines functionality of the video production system.

20. The wiring cradle of claim 19, wherein the interconnect configuration defines a physical location for each of a plurality of video processing components.

21. The wiring cradle of claim 20, wherein the processor is further configured to:
   identify the video processing device; and
   establish the connections between the one or more connectors and the at least one component in the video production system when the video processing device is physically located in accordance with the interconnect configuration.

22. The wiring cradle of claim 19, wherein the processor is further configured to:
   identify a type of the video processing device; and
   select the interconnect configuration corresponding to the type of the video processing device from a plurality of interconnect configurations maintained by the programmable non-volatile storage.

23. The wiring cradle of claim 19, wherein the video processing device comprises one or more of a recording device, a communications gateway, a base station that controls operation of a camera, a video mixer, a special effects processor, and a video encoder.

24. The wiring cradle of claim 19, wherein the configuration entity comprises one or more of a communications gateway, a base station that controls operation of a camera, a video mixer, a special effects processor, and a video encoder.

25. An apparatus for interconnecting broadcast video equipment by installing a wiring cradle in a video production system and securing the wiring cradle to a rack or enclosure, comprising:
   means for establishing one or more electrical or optical connections between the wiring cradle and an element of the video production system;
   means for mounting a video processing component in the wiring cradle; and
   means for establishing an electrical connection through the wiring cradle between the video processing component and at least one other component of the video production system according to an interconnection configuration for the video production system, wherein the establishing of the electrical connection comprises programmatically routing signals received through one or more connectors.

* * * * *